J. THORNTON.
Vehicle-Spring.
No. 203,567. Patented May 14, 1878.
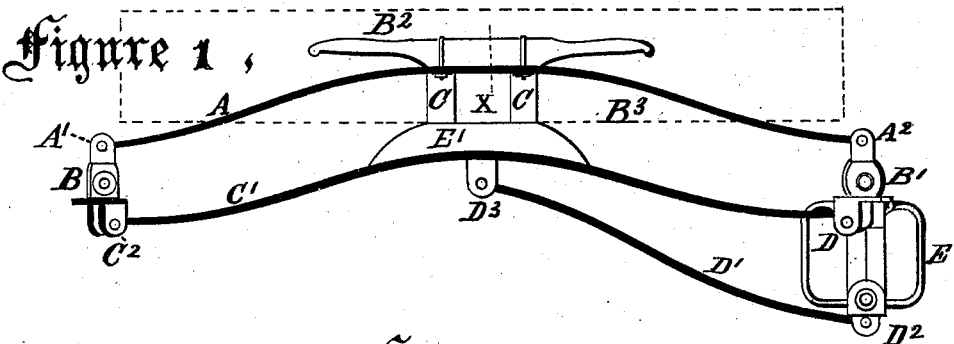
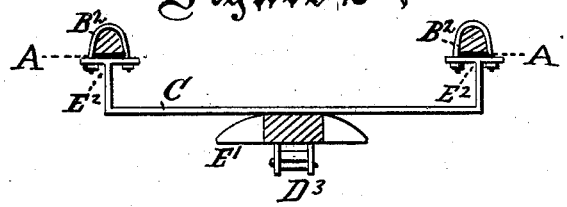
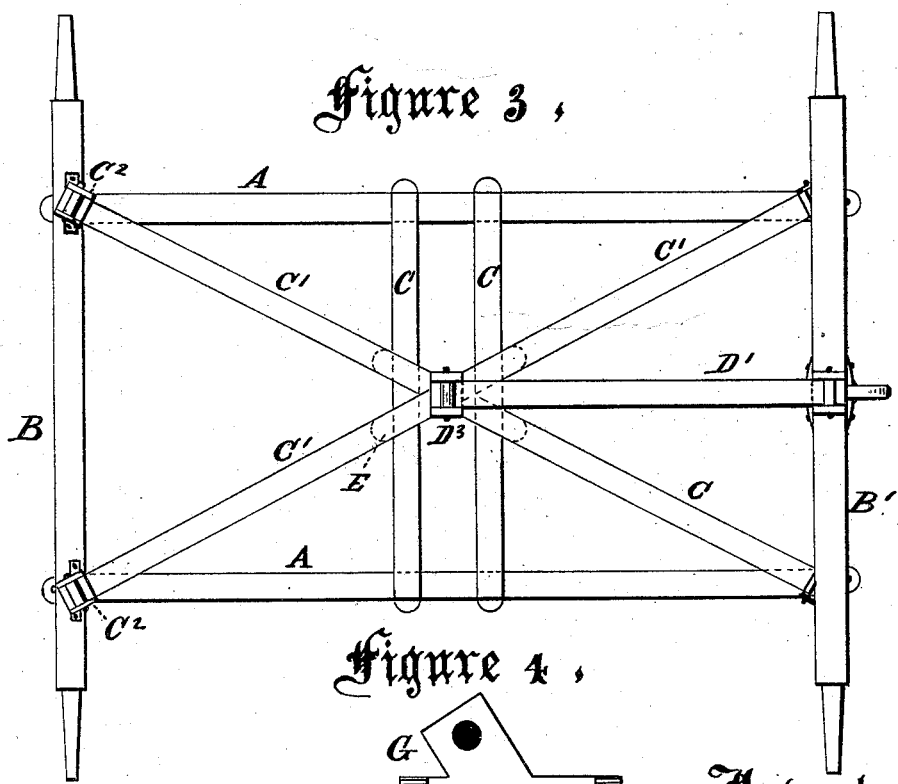
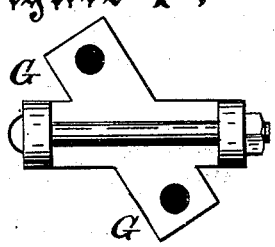
Witnesses,
Inventor,
James Thornton.
By James Sangster
Atty.

UNITED STATES PATENT OFFICE.

JAMES THORNTON, OF WELLSVILLE, NEW YORK.

IMPROVEMENT IN VEHICLE-SPRINGS.

Specification forming part of Letters Patent No. 203,567, dated May 14, 1878; application filed August 29, 1877.

*To all whom it may concern:*

Be it known that I, JAMES THORNTON, of Wellsville, in the county of Allegany and State of New York, have invented certain new and useful Improvements in Vehicle-Springs, which improvements are fully set forth in the following specification and accompanying drawings, in which—

Figure 1 is a side elevation; Fig. 2, a transverse section through line X, Fig. 1; Fig. 3, a plan view of the under part of the vehicle; and Fig. 4 represents an enlarged view of one of the clips for holding the ends of the lower cross-springs.

The object of this invention is to produce a suitable arrangement of springs for light carriages or wagons; and it consists of a double set of springs, combined with a supplementary strengthening-spring, pivoted to the under part of the front axle, and to the lower springs near the center of the under part of the vehicle, one set of springs being arranged parallel to the other, and pivoted to the upper part of the rear axle, and to the upper part of the bolster on the front axle, the other (or lower) set being pivoted to the under part of the rear axle and under part of said bolster, in diagonal clip-ties, so as to cross each other near the center of the vehicle, as will be more clearly hereinafter shown, the whole being firmly held together by a strengthening-block and cross-braces, arranged so that the body of the vehicle may be suspended between the upper set of springs, thereby bringing it lower down.

In the drawings, A represents the upper set of springs, arranged parallel to each other, and pivoted to the perforated lugs or clips $A^1$ on top of the rear axle B, and $A^2$ on the bolster $B^1$. $B^2$ $B^2$ represent two longitudinal bars for supporting the body of the vehicle, which is suspended to and between them, so that the bottom will be about or near the dotted lines $B^3$, Fig. 1. $C^1$ represents the lower springs, arranged so as to cross each other, as shown, and are pivoted to the lugs $C^2$ under the rear axle, and to the lugs D under the bolster. These lugs are made so as to incline at an angle to the shaft, as shown in Fig. 4, so as to be in the proper position to receive the springs $C^1$. $D^1$ is the auxiliary spring, pivoted to the under part of the front axle at $D^2$, and near the center of the under part of the vehicle in the perforated lug $D^3$.

The object of the spring $D^1$ is to prevent the lower part of the front axle from being drawn forward and twisting or breaking the springs or parts above it, consequent upon the strain produced on the yoke E while drawing the vehicle. $E^1$ is an X-shaped brace or strengthening-block, by which the lower springs are rigidly held together, and to which the cross-bars C are fastened by bolts or their equivalents. The braces C are constructed so that the vertical parts $E^2$ come under the springs A, so as not to interfere with the body of the vehicle when placed between said springs, as hereinbefore mentioned.

The braces C may be made of wood and iron combined, or they may be made of either wood or iron. G, Fig. 4, is the clip-tie arranged diagonally.

My invention is limited to the construction hereinafter claimed, as other devices shown and described, but not claimed, form the subject of a separate pending application, and I hereby disclaim the same.

I do not claim, broadly, the springs $C^1$ arranged so as to cross each other, as shown; but What I do claim is—

The combination, with the side springs, cross-bars, and crossed spring $C^1$ $C^1$, of the X-shaped union-block $E^1$, clip $D^3$, and spring $D^1$, as specified.

JAMES THORNTON.

Witnesses:
JAMES SANGSTER,
A. W. SANGSTER.